(12) United States Patent
Kida et al.

(10) Patent No.: US 7,656,499 B2
(45) Date of Patent: Feb. 2, 2010

(54) METHOD OF MANUFACTURING LIQUID CRYSTAL DISPLAY BY DISPENSING LIQUID CRYSTAL DROPLETS ON EXPOSURE JOINT LINES

(75) Inventors: Tetsuya Kida, Kawasaki (JP); Shota Makimoto, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 521 days.

(21) Appl. No.: 11/054,333

(22) Filed: Feb. 9, 2005

(65) Prior Publication Data
US 2006/0044506 A1 Mar. 2, 2006

(30) Foreign Application Priority Data
Sep. 1, 2004 (JP) .............................. 2004-254002

(51) Int. Cl.
*G02F 1/1341* (2006.01)
(52) U.S. Cl. .................................... 349/189; 349/187
(58) Field of Classification Search ................. 349/187, 349/189, 190
See application file for complete search history.

(56) References Cited

U.S. PATENT DOCUMENTS

| | | | | |
|---|---|---|---|---|
| 5,263,888 A * | 11/1993 | Ishihara et al. | ................. | 445/25 |
| 5,285,302 A * | 2/1994 | Wu | ............... | 349/43 |
| 5,784,135 A * | 7/1998 | Inada et al. | ................... | 349/85 |
| 2001/0026348 A1* | 10/2001 | Murata et al. | ............... | 349/187 |
| 2003/0223030 A1* | 12/2003 | Byun et al. | ................. | 349/187 |

FOREIGN PATENT DOCUMENTS

| | | |
|---|---|---|
| JP | 2002-090757 | 3/2002 |
| JP | 2002-341361 | 11/2002 |

* cited by examiner

*Primary Examiner*—Andrew Schechter
(74) *Attorney, Agent, or Firm*—Greer, Burns & Crain, Ltd.

(57) ABSTRACT

The invention relates to a method of manufacturing a liquid crystal display for which the one drop filling method is used to fill the gap between the substrates thereof and provides a method of manufacturing a liquid crystal display which can achieve high display characteristics. Droplets of a liquid crystal are dispensed in positions associated with exposure joint lines at boundaries between respective couples of adjoining regions to be exposed. Since this prevents stripe-like irregularities and grid-like irregularities from overlapping each other, display irregularities become less visually perceptible.

6 Claims, 7 Drawing Sheets

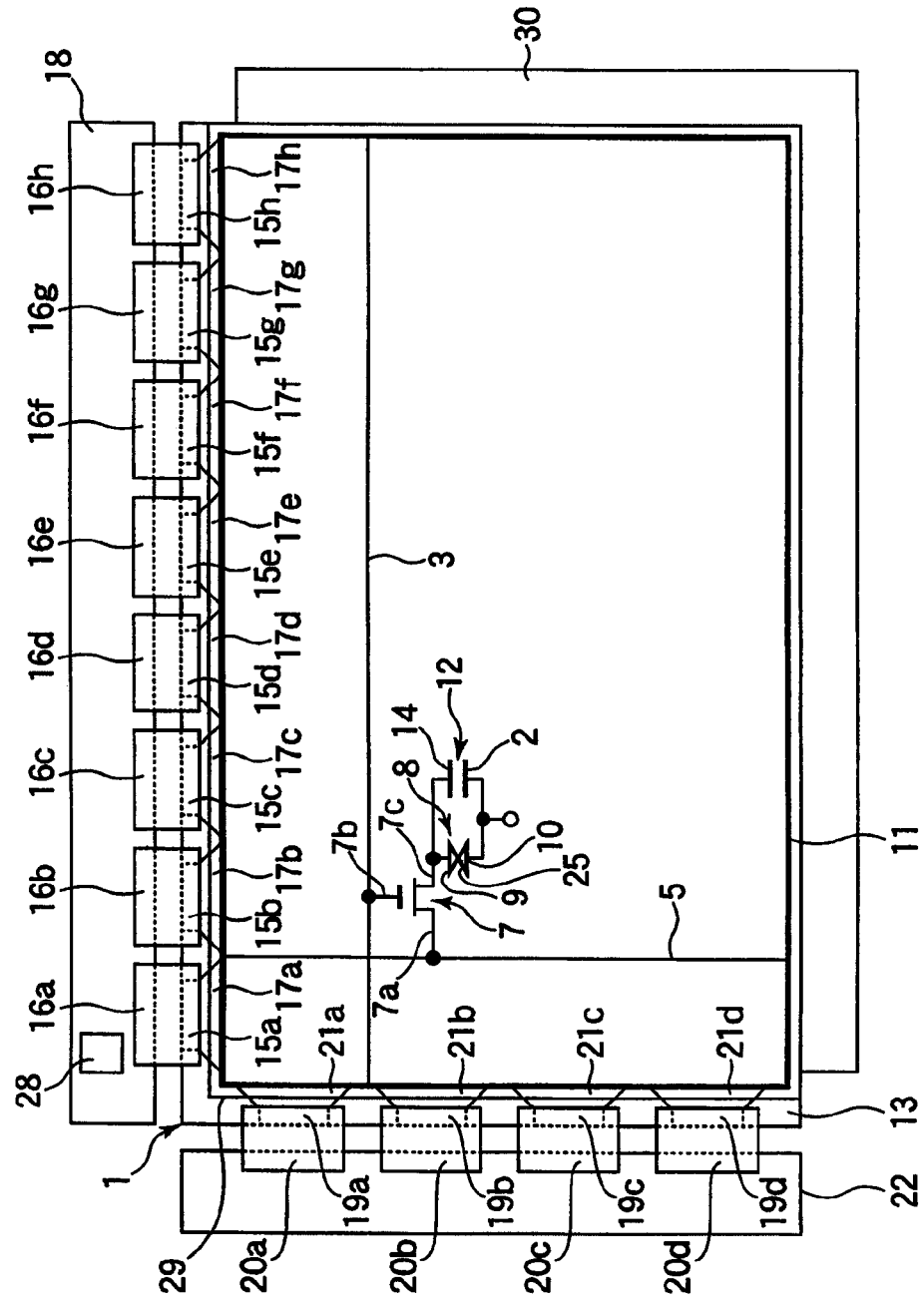

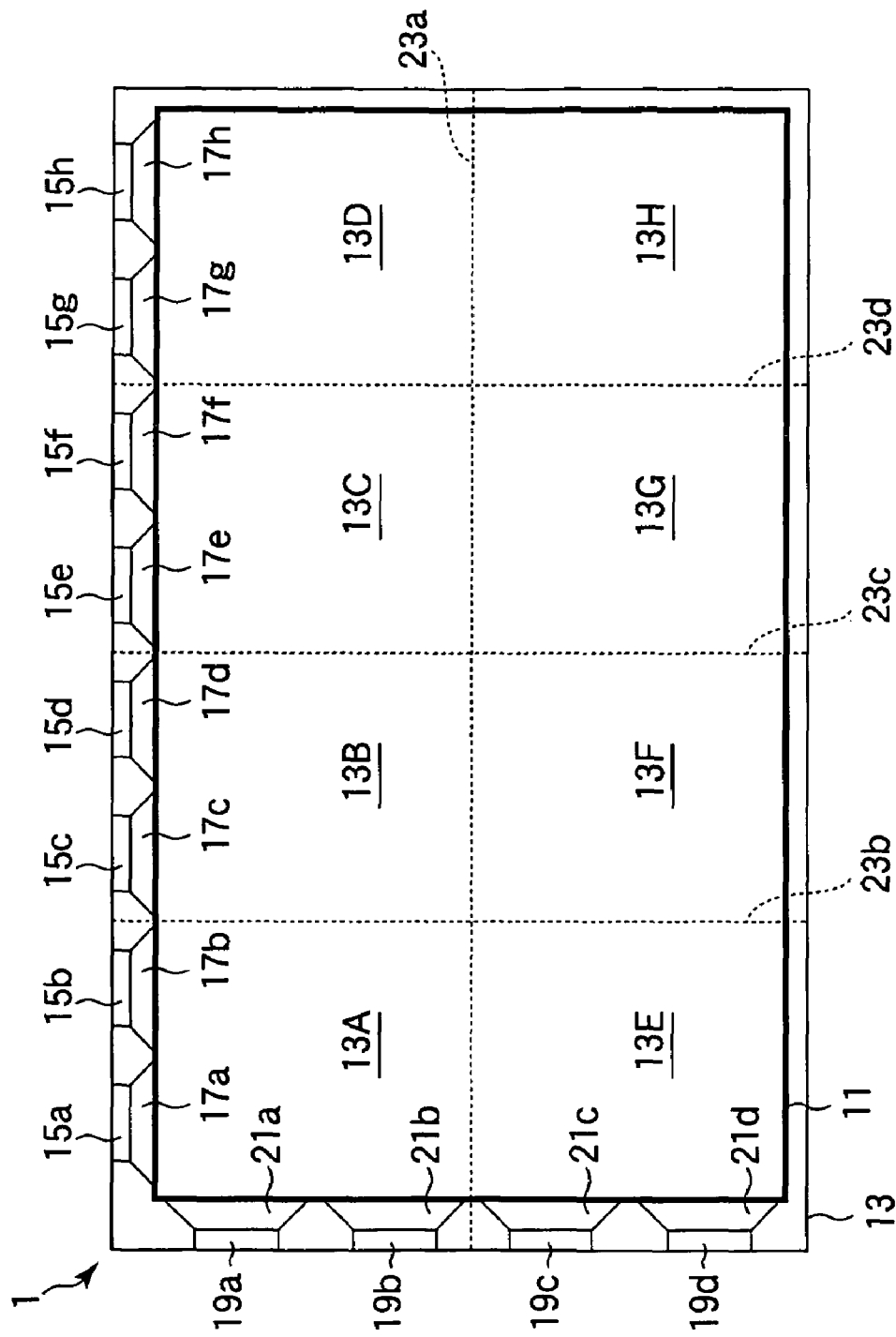

METHOD OF MANUFACTURING LIQUID CRYSTAL DISPLAY BY DISPENSING LIQUID CRYSTAL DROPLETS ON EXPOSURE JOINT LINES

BACKGROUND OF THE INVENTION

1. Field of the Invention

The present invention relates to a method of manufacturing a liquid crystal display in which a gap between substrates is filled with a liquid crystal using the one drop filling method.

2. Description of the Related Art

FIG. 5 shows a schematic configuration of a liquid crystal display panel according to the related art. FIG. 5 also shows an equivalent circuit of one pixel. As shown in FIG. 5, the liquid crystal display panel is constructed by combining an array substrate 51 constituted by a glass substrate 63 having thin film transistors (TFTs) 57 formed thereon and an opposite substrate 79 having a color filter (CF) layer (not shown) formed thereon in a face-to-face relationship using a sealing material 61 to seal a liquid crystal 75 between the substrates.

At one of the shorter ends of the glass substrate 63 used as the array substrate 51, OLB (Outer Lead Bonding) pads 69a, 69b, 69c and 69d (hereinafter briefly referred to as OLB pads 69a to 69d) are formed, driver ICs for driving a plurality of gate bus lines (only one gate bus line 53 is shown in FIG. 5) being connected to the respective pads. Each of the OLB pads 69a to 69d has a plurality of voltage supply terminals (not shown) formed substantially orthogonal to the shorter end of the glass substrate 63 at a predetermined pitch.

Lead-out wiring portions 71a, 71b, 71c and 71d (hereinafter briefly referred to as lead-out wiring portions 71a to 71d) are formed such that they extend from the OLB pads 69a to 69d toward a display area that is surrounded by the sealing material 61. The sealing material 61 is formed like a frame at the periphery of the glass substrate 63. The lead-out wiring portions 71a to 71d have a plurality of lead-out wirings (not shown) connected to the voltage supply terminals of the OLB pads 69a to 69d, respectively. A gate bus line extending in the horizontal direction in the figure is connected to each of the lead-out wirings.

At one of the longer ends of the glass substrate 63, OLB pads 65a, 65b, 65c, 65d, 65e, 65f, 65g and 65h (hereinafter briefly referred to as OLB pads 65a to 65h) are formed, driver ICs for driving a plurality of drain bus lines (only one drain bus line 55 is shown in FIG. 5) being connected to the pads. Each of the OLB pads 65a to 65h has a plurality of voltage supply terminals (not shown) formed substantially orthogonal to the longer end of the glass substrate 63 at a predetermined pitch.

Lead-out wiring portions 67a, 67b, 67c, 67d, 67e, 67f, 67g and 67h (hereinafter briefly referred to as lead-out wiring portions 67a to 67h) are formed such that they extend from the OLB pads 65a to 65h toward the display area. The lead-out wiring portions 67a to 67h have a plurality of lead-out wirings (not shown) connected to the voltage supply terminals of the OLB pads 65a to 65h, respectively. A drain bus line extending in the vertical direction in the figure is connected to each of the lead-out wirings.

The plurality of gate bus lines are formed such that they intersect the plurality of drain bus lines with an insulation film, which is not shown, interposed between them. A TFT is formed at a pixel region which is formed at each of intersections between the gate bus lines and the drain bus lines. As shown in FIG. 5, for example, a TFT 57 and a pixel electrode 59 are formed at the intersection between the gate bus line 53 and the drain bus line 55. A drain electrode 57a of the TFT 57 is electrically connected to the drain bus line 55. A gate electrode 57b of the TFT is electrically connected to the gate bus line 53. A source electrode 57c of the TFT is electrically connected to the pixel electrode 59. A glass substrate is used as the opposite substrate 79 just as done for the array substrate 51, and an opposite electrode 60 is formed on an entire surface of the glass substrate. A liquid crystal capacitance 58 is formed by the pixel electrode 59, the opposite electrode 60 and a liquid crystal 75 that is sandwiched between the pixel electrode 59 and the opposite electrode 60.

The gate bus lines 53, the drain bus lines 55 and the TFTs 57 are formed using a photolithographic technique at a step for manufacturing the array substrate 51. In the case of a liquid crystal display having a large display area, it may be difficult to transfer patterns on an entire glass substrate 63 at a time for reasons associated with the structure of the exposure apparatus used. For this reason, divisional exposure is performed, in which an entire patterned region of the glass substrate 63 is exposed after dividing it into a plurality of regions to be exposed. During divisional exposure, a predetermined exposure mask is used for each divided region to be exposed. A resist film formed on the glass substrate 63 is shield from light in regions other than the divided regions to be exposed, and each of the divided regions to be exposed is exposed using a predetermined exposure mask and is thereafter developed to form a resist pattern for the entire regions.

During divisional exposure, the exposure mask for each divided region to be exposed is aligned with the glass substrate 63. Therefore, the exposure mask for each divided region to be exposed can be misaligned with the glass substrate 63, and the width of an overlap between the source electrode 57c and the gate electrode 57b of the TFT 57 may be different in each of the divided regions to be exposed. In this case, since parasitic capacitances that are formed between the gate electrodes 57b and the source electrodes 57c of TFTs 57 in each of the divided regions to be exposed are different from those in other regions, a difference in pixel potential occurs between the divided regions to be exposed, which results in a difference in light transmittance. Therefore, differences in luminance occur on the display screen of the liquid crystal display and will be visually perceived as irregularities of display. For example, when gray is displayed on the display screen, stripe-like irregularities 74 may be visually perceived on exposure joint lines 73 at boundaries between divided regions to be exposed adjacent to each other.

The one drop filling method is known as a method of filling the gap between the array substrate 51 and the opposite substrate 79 with a liquid crystal. The one drop filling method and a liquid crystal display panel formed using the same will be described with reference to FIG. 6. For example, according to the one drop filling method, a prescribed amount of the liquid crystal 75 is dispensed onto a substrate surface inside the sealing material 61 formed like a frame at the periphery of the array substrate 51 such that the droplets form a matrix as shown in FIG. 6, and the array substrate 51 and the opposite substrate 79 are combined in vacuum. Next, the substrates 51 and 79 are returned to the atmospheric pressure, and the liquid crystal 75 is consequently spread by the atmospheric pressure. The sealing material 61 is cured while the liquid crystal 75 is spread. The liquid crystal display panel is then heated to cause the liquid crystal to flow, whereby the layer of the liquid crystal 75 sealed between the array substrate 51 and the opposite substrate 79 has a uniform thickness. The liquid crystal display panel is thus completed.

In general, the positions and number of droplets of the liquid crystal 75 are determined in consideration to the spreading property of the liquid crystal 75 and the takt time and dispensing capability of the dispenser used, and certain regularity is found in them. For example, droplets of the liquid crystal 75 may be dispensed in the form of a matrix as shown in FIG. 6 or may be dispensed in a staggered configuration in which the droplets are offset with respect to one another by half a pitch. All droplets of the liquid crystal 75 dispensed on the array substrate 51 spread in every direction at substantially the same speed when the two substrates 51 and 79 are combined. As a result, adjoining droplets of the liquid crystal 75 contact each other substantially in the middle of the gap between the respective dispensing positions. Boundaries at which adjoining droplets of the liquid crystal 75 contact each other within the surface of the array substrate 51 have grid-like contours when the liquid crystal 75 is dispensed in the form of a matrix and honey-comb-like contours when the liquid crystal is dispensed in a staggered configuration.

The display screen of the liquid crystal display formed using the one drop filling method may have display irregularities which follow the contours of the boundaries where adjoining droplets of the liquid crystal 75 contact each other. For example, let us assume that the liquid crystal 75 is dispensed in the form of a matrix as shown in FIG. 6. When gray is displayed throughout the display screen, dark grid-like irregularities 77 may be visually perceived at the boundaries where adjoining droplets of the liquid crystal 75 contact each other.

Patent Document 1: Japanese Patent Laid-Open No. JP-A-2002-341361

Patent Document 2: Japanese Patent Laid-Open No. JP-A-2002-09757

Recently, liquid crystal displays are extensively used as display screens of television receivers. When a liquid crystal display is used in a television receiver, the luminance of a backlight unit provided in the display is set higher than that in the case of the use of the display in a personal computer. Therefore, stripe-like irregularities 74 at exposure joint lines 73 become more visually perceptible and so do grid-like irregularities 77 at boundaries where adjoining droplets of the liquid crystal 75 contact each other.

The stripe-like irregularities 74 and the grid-like irregularities 77 can be made less visually perceptible by improving the accuracy of alignment between exposure masks of the divisional exposure apparatus or adjusting the positions and number of droplets of the liquid crystal 75. However, when the positions of exposure joint lines 73 are coincident with or very close to boundaries where adjoining droplets of the liquid crystal 75 contact each other as shown in FIG. 7, a synergistic effect between stripe-like irregularities 74 and grid-like irregularities 77 generates stripe-like irregularities 81 which are deeper in color than the irregularities 74 and 77. In this case, it is not possible to make the stripe-like irregularities 81 less noticeable by improving the accuracy of alignment between the exposure masks of the divisional exposure apparatus or adjusting the positions and number of droplets of the liquid crystal 75, and the display quality of the liquid crystal display will be significantly degraded by the stripe-like irregularities 81.

It is an object of the invention to provide a method of manufacturing a liquid crystal display which can achieve high display characteristics.

SUMMARY OF THE INVENTION

The above-described object is achieved by a method of manufacturing a liquid crystal display, characterized in that it has the steps of forming a pattern layer on an array substrate by dividing a surface of the substrate into a plurality of regions to be exposed and performing divisional exposure for exposing each of the regions to be exposed, dispensing a plurality of droplets of a liquid crystal onto at least either the array substrate or an opposite substrate provided opposite to the array substrate such that a boundary at which adjoining droplets of the liquid crystal contact each other does not overlap an exposure joint line at a boundary between two of the regions to be exposed adjacent to each other, combining the array substrate and the opposite substrate in vacuum in a face-to-face relationship with each other and restoring the atmospheric pressure to spread and seal the plurality of droplets of the liquid crystal between the array substrate and the opposite substrate.

The invention makes it possible to manufacture a liquid crystal display having high display characteristics.

BRIEF DESCRIPTION OF THE DRAWINGS

FIG. 1 shows a schematic configuration of a liquid crystal display according to an embodiment of the invention;

FIG. 2 shows a method of manufacturing a liquid crystal display according to the embodiment of the invention;

DESCRIPTION OF THE PREFERRED EMBODIMENT

Figure 3A:
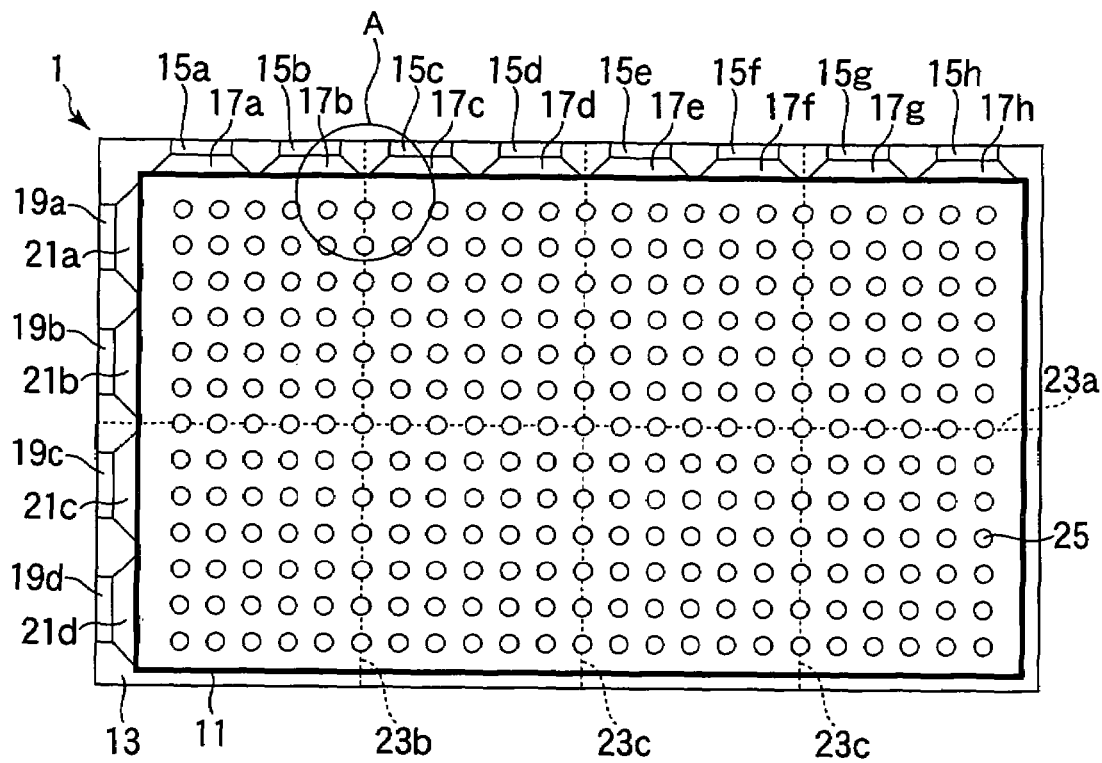
FIGS. 3A and 3B show the method of manufacturing a liquid crystal display according to the embodiment of the invention.

A method of manufacturing a liquid crystal display according to an embodiment of the invention will now be described with reference to FIGS. 1 to 4. First, a schematic configuration of the liquid crystal display of the present embodiment will be described with reference to FIG. 1. FIG. 1 also shows an equivalent circuit of one pixel. As shown in FIG. 1, the liquid crystal display has a liquid crystal display panel which is constructed by combining an array substrate 1 having thin film transistors (TFTs) 7 formed thereon and an opposite substrate 29 having color filters (not shown) and an opposite electrode 10 formed thereon in a face-to-face relationship using a sealing material 11 to seal a liquid crystal 25 between the substrates 1 and 29.

At one of shorter ends of a glass substrate 13 used as the array substrate 1, OLB pads 19a, 19b, 19c and 19d (hereinafter briefly referred to as OLB pads 19a to 19d) are formed. Each of the OLB pads 19a to 19d has a plurality of voltage supply terminals (not shown) formed substantially orthogonal to the shorter end of the glass substrate 13 at a predetermined pitch.

Lead-out wiring portions 21a, 21b, 21c and 21d (hereinafter briefly referred to as lead-out wiring portions 21a to 21d) are formed such that they extend from the OLB pads 19a to 19d toward a display area that is surrounded by the sealing material 11. The sealing material 11 is formed like a frame at the periphery of the glass substrate 13. The lead-out wiring portions 21a to 21d have a plurality of lead-out wirings (not shown) connected to the voltage supply terminals of the OLB pads 19a to 19d, respectively. Gate bus lines (only one gate bus line 3 is shown in FIG. 1) extending in the horizontal direction in the figure are connected to the respective lead-out wirings.

At one of the longer ends of the glass substrate 13, OLB pads 15a, 15b, 15c, 15d, 15e, 15f, 15g and 15h (hereinafter briefly referred to as OLB pads 15a to 15h) are formed. Each of the OLB pads 15a to 15h has a plurality of voltage supply terminals (not shown) formed substantially orthogonal to the longer end of the glass substrate 13 at a predetermined pitch.

Lead-out wiring portions 17a, 17b, 17c, 17d, 17e, 17f, 17g and 17h (hereinafter briefly referred to as lead-out wiring portions 17a to 17h) are formed such that they extend from the OLB pads 15a to 15h toward the display area. The lead-out wiring portions 17a to 17h have a plurality of lead-out wirings connected to the voltage supply terminals of the OLB pads 15a to 15h, respectively. Drain bus lines (only one drain bus line 5 is shown in FIG. 1) extending in the vertical direction in the figure is connected to the respective lead-out wirings.

The plurality of gate bus lines are formed such that they intersect the plurality of drain bus lines with an insulation film, which is not shown, interposed between them. A TFT is formed at a pixel region which is formed at each of intersections between the gate bus lines and the drain bus lines. As shown in FIG. 1, for example, a TFT 7 and a pixel electrode 9 are formed at the intersection between the gate bus line 3 and the drain bus line 5. A drain electrode 7a of the TFT 7 is electrically connected to the drain bus line 5. A gate electrode 7b of the TFT is electrically connected to the gate bus line 3. A source electrode 7c of the TFT is electrically connected to the pixel electrode 9. A glass substrate is used as the opposite substrate 29 just as done for the array substrate 1, and the opposite electrode 10 is formed on an entire surface of the glass substrate. A liquid crystal capacitance 8 is formed by a liquid crystal 25 that is sandwiched between the pixel electrode 9 and the opposite electrode 10. A storage capacitor 12 is formed, which is parallel-connected to the liquid crystal capacitance 8. The storage capacitor 12 is formed by a storage capacitor bus line 2, a storage capacitor electrode (intermediate electrode) 14 and an insulation film which is sandwiched between the storage capacitor bus line 2 and the storage capacitor electrode 14. The storage capacitor bus line 2 is electrically connected to the opposite electrode 10. The storage capacitor electrode 14 is electrically connected to the pixel electrode 9.

Driver ICs 20a, 20b, 20c and 20d (hereinafter briefly referred to as driver ICs 20a to 20d) for driving the plurality of gate bus lines are connected to the OLB pads 19a to 19d, respectively. The driver ICs 20a to 20d are mounted on a printed circuit board (PCB) 22. Driver ICs 16a, 16b, 16c, 16d, 16e, 16f, 16g and 16h (hereinafter briefly referred to as driver ICs 16a to 16h) for driving the plurality of drain bus lines are connected to the OLB pads 15a to 15h, respectively. The driver ICs 16a to 16h are mounted on a PCB 18.

The driver ICs 16a to 16h output data signals to predetermined drain bus lines based on predetermined signals output by a control circuit 28 mounted on the PCB 18, for example. The driver ICs 20a to 20d output a scan signal to predetermined gate bus line based on predetermined signals output by the control circuit 28, for example. A polarizer (not shown) is provided on a substrate surface of the array substrate 1 that is opposite to the element forming surface thereof on which the TFTs 7 and the pattern layers such as the bus lines 3 and 5 are formed, and a backlight unit 30 is attached to a surface of the polarizer that is opposite to the surface facing the array substrate 1. A polarizer (not shown) is applied to a surface of the opposite substrate 29 that is opposite to the surface on which the opposite electrode 10 is formed.

A method of manufacturing the liquid crystal display according to the present embodiment will now be described with reference to FIGS. 2 to 4. First, the OLB pads 15a to 15h and 19a to 19d are formed on the glass substrate 13 for forming the array substrate 1 as shown in FIG. 2. The OLB pads 15a to 15h and 19a to 19d are formed using a photolithographic technique, and they are formed by repeating a semiconductor process consisting of a series of steps, i.e., film formation, resist application, exposure, development, etching, and resist removal. When the glass substrate 13 has great outline dimensions, it is difficult to transfer patterns on the entire glass substrate 13 at a time for reasons associated with the structure of the exposure apparatus used. For this reason, at the exposure step of the above-mentioned semiconductor process, divisional exposure is performed, in which an entire region for patterning on the glass substrate 13 is exposed after dividing it into a plurality of regions to be exposed. In the present embodiment, for example, the glass substrate 13 is divided into eight regions 13A, 13B, 13C, 13D, 13E, 13F, 13G and 13H to be exposed (hereinafter briefly referred to as exposure regions 13A to 13H), and exposure is performed for each of the exposure regions 13A to 13H.

At the step of forming the array substrate 1, for example, in order to form the OLB pads 19a to 19d, the lead-out wiring portions 21a to 21d, and the gate bus lines on the glass substrate 13, a metal film that is the material of those elements is formed on the glass substrate 13.

Next, a resist film is applied to the entire surface of the glass substrate 13 on which the metal film is formed. The glass substrate 13 having the resist film thus applied is then placed on an exposure apparatus (not shown). The glass substrate 13 is then moved relative to a light source of the exposure apparatus to expose the resist film in the exposure regions 13A, 13B, 13C, 13D, 13H, 13G, 13F and 13E in the order listed. At this time, each of the exposure regions is exposed using a predetermined exposure mask (not shown) while shielding regions other than the exposure regions to be exposed from light. A common exposure mask may be used for regions to be patterned into the same configurations such as the exposure regions 13B and 13C or the exposure regions 13F and 13G.

Next, the resist film is developed to form an overall resist pattern. Etching is then performed to remove the resist film. As a result, the OLB pads 19a to 19d, the lead-out wiring portions 21a to 21d and the gate bus lines are formed on the glass substrate 13. Next, an insulation film which is not shown is formed on the entire surface of the glass substrate 13 on which the OLB pads 19a to 19d and so on are formed. Then, divisional exposure is similarly performed using another exposure mask to form the OLB pads 15a to 15h, the lead-out wiring portions 17a to 17h, the drain bus lines, and the drain electrodes and the source electrodes of the TFTs.

Next, an insulation film (not shown) is formed on the entire surface of the glass substrate 13 on which the OLB pads 15a to 15h and so on are formed, and then, divisional exposure is similarly performed using still another exposure mask to form an opening in part of each source electrode to provide a plurality of contact holes (not shown) in the insulation film. Furthermore, divisional exposure is performed using still another exposure mask to form a plurality of pixel electrodes having a predetermined shape. The pixel electrodes are electrically connected to the respective source electrodes through the contact holes. The array substrate 1 is thus completed.

Since the array substrate 1 is formed using divisional exposure as thus described, exposure joint lines 23a, 23b, 23c and 23d are constituted by boundaries where the exposure regions 13A to 13H adjoin each other. The exposure joint line 23a is constituted by the boundary between the set of the exposure regions 13A, 13B, 13C and 13D and the set of the exposure regions 13E, 13F, 13G and 13H. The exposure joint line 23b is constituted by the boundary between the pair of the exposure regions 13A and 13E and the pair of the exposure regions 13B and 13F. Similarly, the exposure joint lines 23c and 23d are constituted by the boundary between the pair of the exposure regions 13B and 13F and the pair of the exposure regions 13C and 13G and the boundary between the pair of the exposure regions 13C and 13G and the pair of the exposure regions 13D and 13H, respectively. The exposure joint line 23a is substantially in parallel with the gate bus lines, and the exposure joint lines 23b, 23c and 23d are substantially in parallel with the drain bus lines.

When the array substrate 1 is completed, the sealing material 11 is applied on the lead-out wiring portions 17a to 17h and 21a to 21d on the array substrate 1 and the other longer end and the other shorter end of the glass substrate 13 such that the material forms a frame. Next, as shown in FIGS. 3A and 3B, a plurality of droplets of the liquid crystal 25 are dispensed by a dispenser (not shown) onto the element forming surface of the array substrate 1.

Figure 3B:
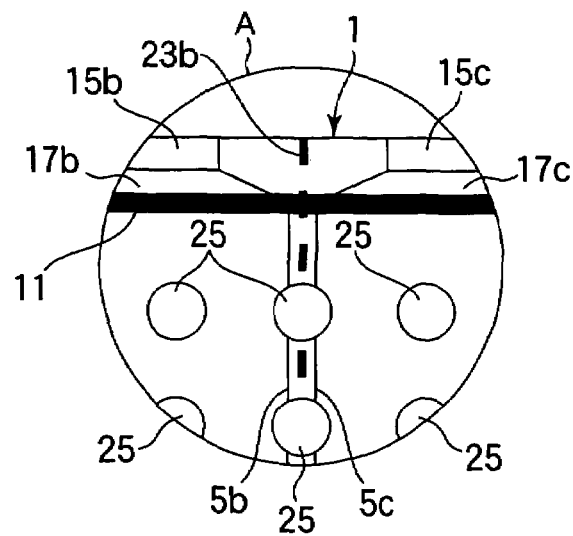

FIGS. 3A and 3B show the positions where the liquid crystal 25 is dispensed. FIG. 3A shows the positions where the liquid crystal 25 is dispensed throughout the array substrate 1. FIG. 3B is an enlarged view of the region in the imaginary circle A in FIG. 3A. As shown in FIG. 3A, the droplets of the liquid crystal 25 are dispensed onto the array substrate 1 at equal intervals in the form of a matrix. At this time, the liquid crystal 25 is dispensed in positions associated with the exposure joint lines 23a, 23b, 23c and 23d. As shown in FIG. 3B, the exposure joint line 23b is located near the gap between a drain bus line 5b which is connected to the right terminal end of the OLB pad 15b as viewed in the figure and a drain bus line 5c which is connected to the left terminal end of the OLB pad 15c as viewed in the figure.

Similarly, the exposure joint line 23c is located near the gap between drain bus lines (not shown) which are connected to the right terminal end of the OLB pad 15d and the left terminal end of the OLB pad 15e, respectively, as viewed in the figure. Similarly, the exposure joint line 23d is located near the gap between drain bus lines (not shown) which are connected to the right terminal end of the OLB pad 15f and the left terminal end of the OLB pad 15g, respectively, as viewed in the figure. The exposure joint line 23a is located near the gap between gate bus lines (not shown) which are connected to the lower terminal end of the OLB pad 19b and the upper terminal end of the OLB pad 19c, respectively, as viewed in the figure. As a result, the droplets of the liquid crystal 25 dispensed in the positions associated with the exposure joint lines 23a, 23b, 23c and 23d are deposited across a plurality of gate bus lines, a plurality of drain bus lines and a plurality of pixel regions.

The droplets of the liquid crystal 25 are dispensed at predetermined equal intervals in a direction that is substantially orthogonal to the exposure joint lines 23a, 23b, 23c and 23d. The droplets of the liquid crystal 25 are dispensed in the positions associated with the exposure joint lines 23a, 23b, 23c and 23d at the predetermined equal intervals.

The intervals at which the liquid crystal 25 is dispensed between the sealing material 11 on the left side of the figure and the exposure joint line 23b and between the sealing material 11 on the right side of the figure and the exposure joint line 23d are the same as the intervals between the droplets of the liquid crystal 25 dispensed between the exposure joint lines 23b and 23c which are adjacent to each other. In this case, only the distance between the droplets of the liquid crystal 25 dispensed in the outermost positions and the sealing material 11 may be different from the interval between adjoining droplets of the liquid crystal 25. As a result, the liquid crystal 25 will not reach the sealing material 11 before the material is cured at a step for spreading the liquid crystal 25 which will be described later. It is therefore possible to prevent the sealing material 11 from contaminating the liquid crystal 25.

Further, the liquid crystal 25 is dispensed onto the array substrate 1 such that the intervals between the droplets of the liquid crystal 25 dispensed in the direction along the gate bus lines are substantially equal to the intervals between the droplets of the liquid crystal 25 dispensed in the direction along the drain bus lines.

Figure 4:
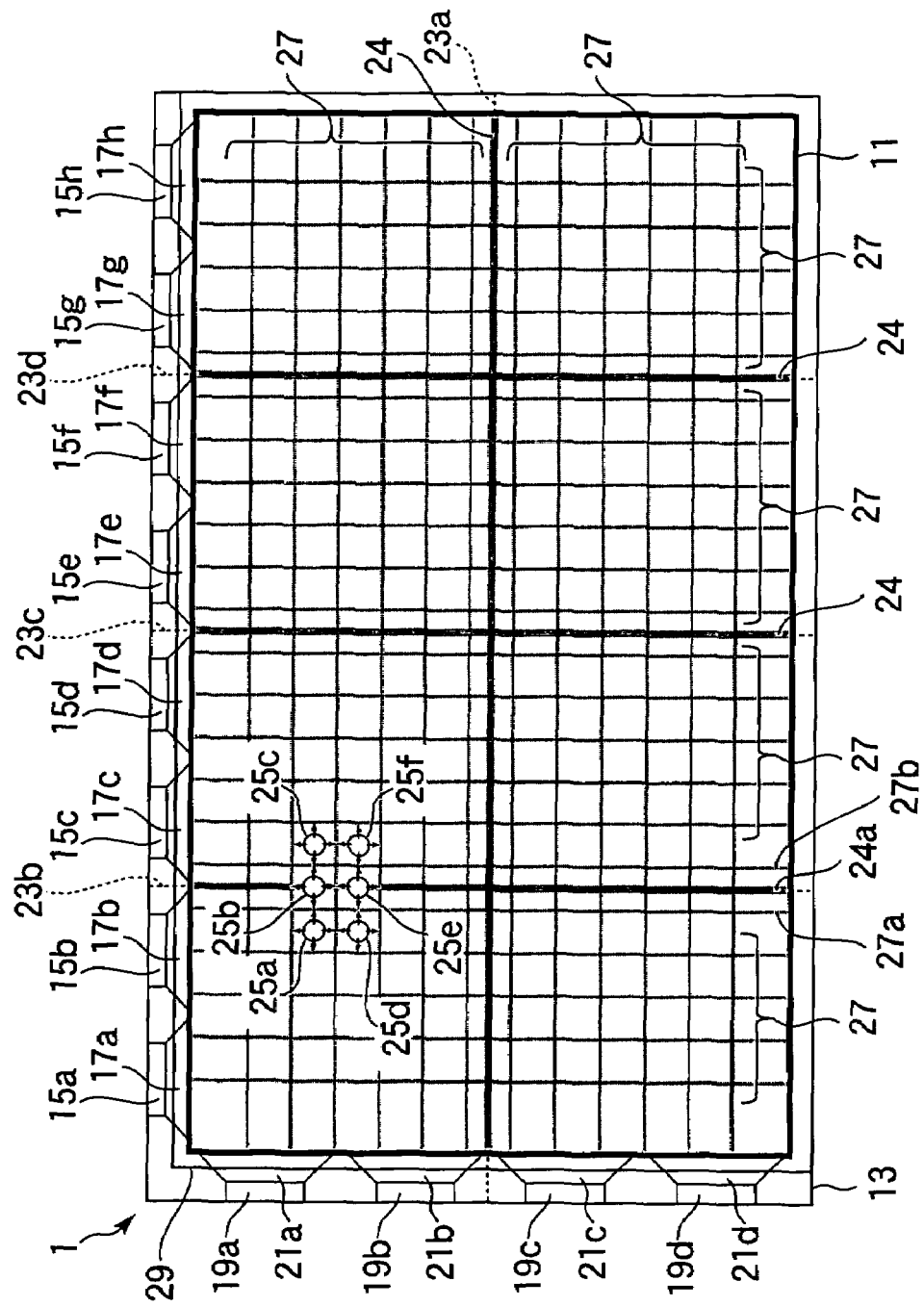
FIG. 4 shows the method of manufacturing a liquid crystal display according to the embodiment of the invention.
Figure 5:
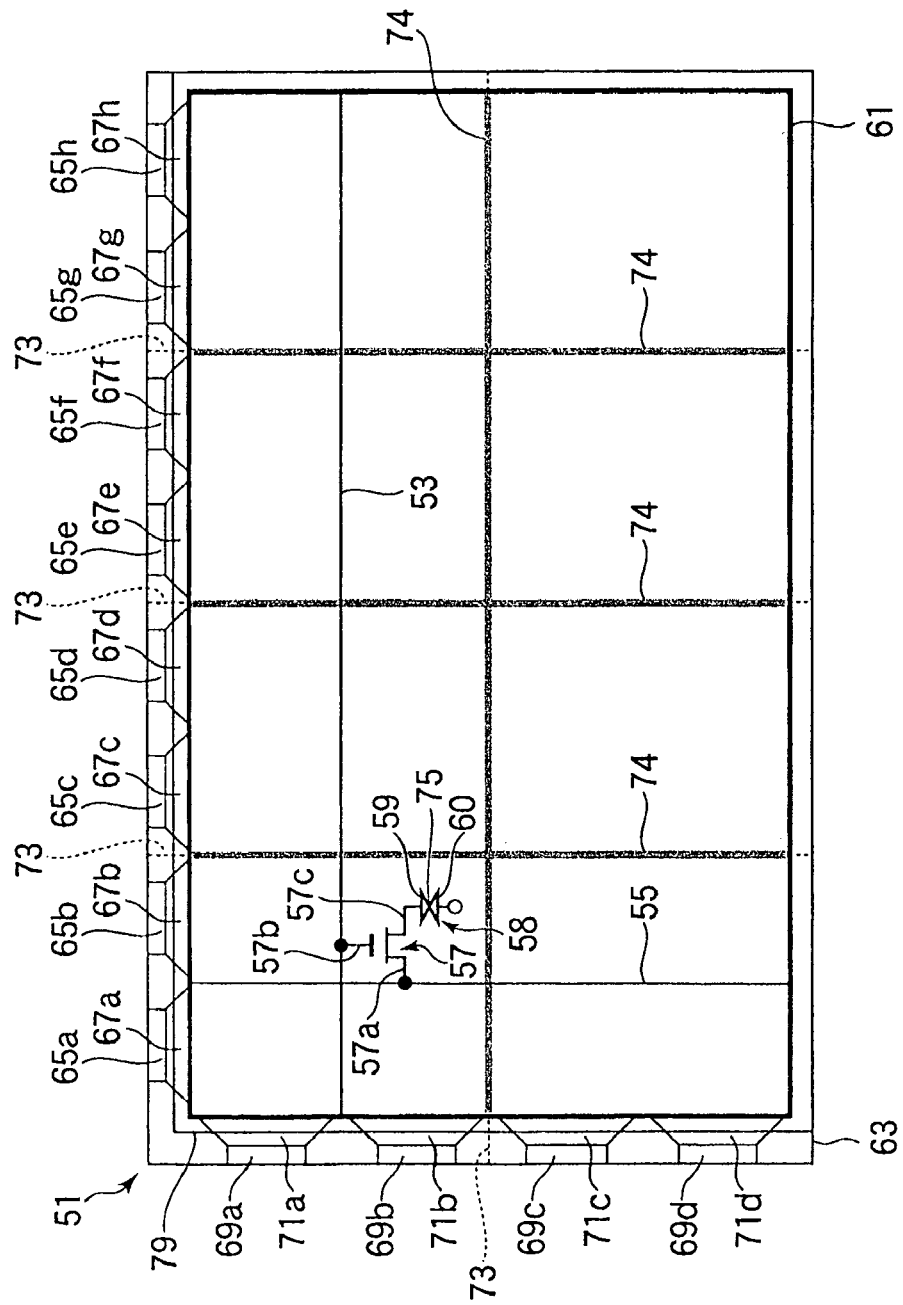
FIG. 5 shows a schematic configuration of a liquid crystal display panel according to the related art.
Figure 6:
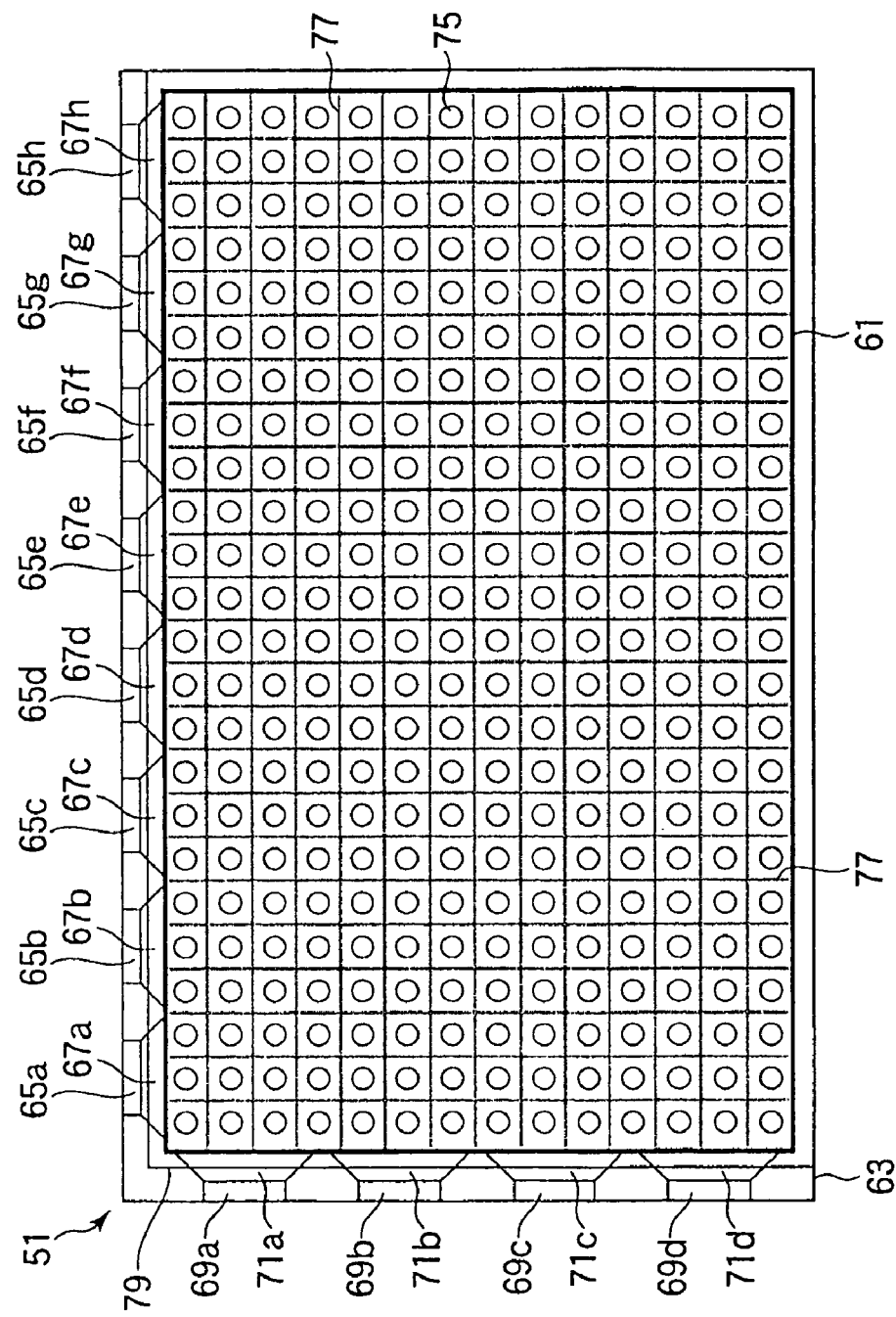
FIG. 6 shows a schematic configuration of a liquid crystal display panel according to the related art formed using the one drop filling method.

Next, as shown in FIG. 4, the opposite substrate 29 having the opposite electrode 10 (see FIG. 1) formed on an entire surface thereof is aligned and combined with the array substrate 1. This step is carried out in vacuum. Then, the combined substrates 1 and 29 are put back in the atmosphere, and the liquid crystal 25 between the array substrate 1 and the opposite substrate 29 thus combined is consequently spread by the atmospheric pressure. FIG. 4 schematically illustrates how liquid crystal droplets 25a, 25b, 25c, 25d, 25e and 25f (hereinafter briefly referred to as liquid crystal droplets 25a to 25f) in 2 rows×3 columns spread. All droplets of the liquid crystal 25 dispensed onto the array substrate 1 spread in every direction at substantially the same speed when the two substrates 1 and 29 are combined. The liquid crystal droplets 25a to 25f spread in every direction as indicated by the arrows in the figure. For example, the liquid crystal droplet 25a contacts the adjacent liquid crystal droplets 25b and 25d substantially in the middle of the gaps between the dispensing positions of itself and the respective droplets. This equally applies to the other liquid crystal droplets 25b to 25f and other liquid crystal droplets which are not shown. That is, adjoining liquid crystal droplets contact each other substantially in the middle of the gaps between the respective dispensing positions.

In the present embodiment, the liquid crystal 25 is dispensed at the exposure joint lines 23a, 23b, 23c and 23d. For example, the liquid crystal droplet 25b spreads in every direction from the position associated with the exposure joint line 23b to contact the adjacent liquid crystal droplets 25a and 25c. Therefore, the boundary at which the liquid crystal droplet 25b contacts the liquid crystal droplet 25a or 25c does not coincide with the position associated with the exposure joint line 23b. This equally applies to all droplets of the liquid crystal 25 dispensed in the positions associated with the exposure joint lines 23a, 23b, 23c and 23d. Therefore, boundaries at which adjoining droplets of the liquid crystal 25 contact each other do not coincide with the exposure joint lines 23a, 23b, 23c and 23d throughout the array substrate 1.

Next, the sealing material 11 is irradiated with UV light by moving an ultraviolet (UV) light source (not shown) along the region where the sealing material 11 is applied while the liquid crystal 25 is spreading, whereby the sealing material 11 is cured. When the UV light has a wavelength of 300 nm or more, it is not essential to radiate UV light while moving the light source, and the region may alternatively be irradiated at a time. Next, the substrates 1 and 29 which have been combined by curing the sealing material 11 are heated to cause the liquid crystal 25 to flow, whereby a uniform cell gap is provided between the substrates 1 and 29. This completes the liquid crystal display panel.

Although not shown, polarizers are then applied to both surfaces of the liquid crystal display panel. Next, the driver ICs 16a to 16h, 20a to 20d and the PCBs 18 and 22 (see FIG. 1) are connected to the liquid crystal display panel. Then, the backlight unit 30 (see FIG. 1) is provided on the array substrate 1. Thus, the liquid crystal display is completed.

Since a plurality of droplets of the liquid crystal 25 are dispensed in the positions associated with the exposure joint lines 23a, 23b, 23c and 23d, the exposure joint lines 23a, 23b, 23c and 23d do not coincide with any contact region where adjoining droplets of the liquid crystal 25 contact each other throughout the display screen of the liquid crystal display. Therefore, dark stripe-like irregularities 24 generated due to the exposure joint lines 23a, 23b, 23c and 23d do not overlap dark grid-like irregularities 27 that follow the contours of boundaries where adjoining droplets of the liquid crystal 25 contact each other, which allows the density of the irregularities to be distributed. As a result, even in displaying gray that is a halftone, it is possible to prevent generation of local display irregularities in deep color attributable to a synergistic effect between stripe-like irregularities 24 and grid-like irregularities 27. It is therefore possible to improve the uniformity of display on a liquid crystal display by reducing the visual perceptibility of display irregularities.

As described above, according to the method of manufacturing a liquid crystal display of the present embodiment, when the two types of display irregularities 24 and 27 resulting from different factors and appearing in a regular manner are visually perceptible under the same display conditions, it is possible to prevent the two types of display irregularities 24 and 27 from overlapping each other by dispensing the liquid crystal 25 in the positions associated with the exposure joint lines 23a, 23b, 23c and 23d. As a result, uniformity can be maintained on the surface of the display screen of the liquid crystal display, and the liquid crystal display can be provided with high display characteristics.

Figure 7:
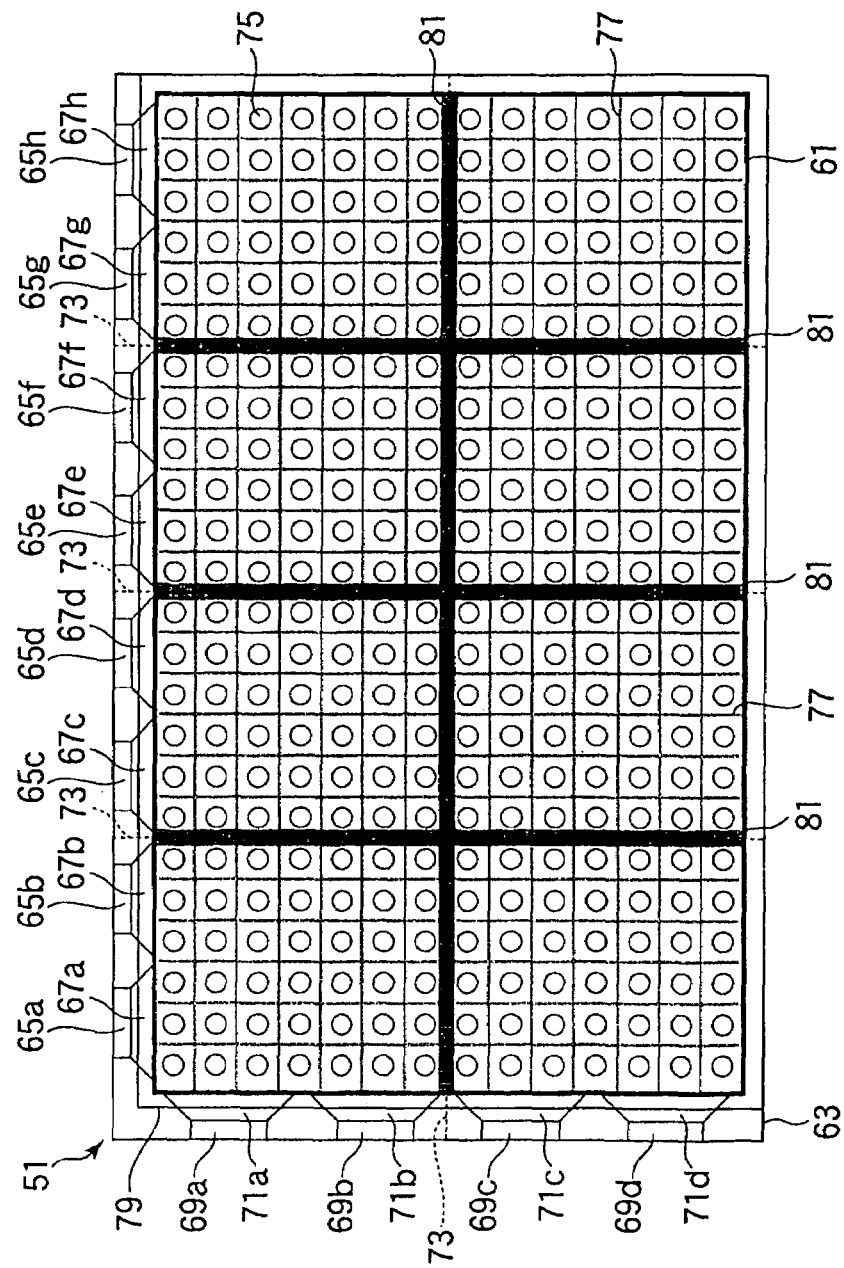
FIG. 7 shows display irregularities generated on the display screen of the liquid crystal display panel according to the related art.

In general, human eyes are characterized in that they are highly sensitive to an abrupt transition of brightness and less sensitive to a gentle transition of brightness. In the present embodiment, as shown in FIG. 4, the distances between the stripe-like irregularity 24a and the grid-like irregularities 27a and 27b are smaller than the distances between a stripe-like irregularity 81 and grid-like irregularities 77 generated on the display screen of the liquid crystal display according to the related art shown in FIG. 7. Further, the difference in deepness of color between the stripe-like irregularity 24a and the grid-like irregularities 27a and 27b generated on the display screen of the liquid crystal display according to the present embodiment is smaller than the difference in deepness of color between the stripe-like irregularity 81 and the grid-like irregularities 77 generated on the display screen of the liquid crystal display according to the related art.

As thus described, in the liquid crystal display of the present embodiment, the stripe-like irregularity 24a and the grid-like irregularities 27a and 27b generated adjacent thereto are spaced at smaller distances and are less different from each other in deepness of color compared to the similar irregularities in the liquid crystal display according to the related art. Since the boundaries between the stripe-like irregularity 24a and the grid-like irregularities 27a and 27b are therefore unclear, brightness changes gently in the neighborhood of the stripe-like irregularity 24a and the grid-like irregularities 27a and 27b. As a result, in the liquid crystal display of the present embodiment, the display irregularity in the neighborhood of the exposure joint line 23a is visually perceived as having a greater width and a lighter tone compared to that in the liquid crystal display according to the related art, and the display irregularity is therefore less observable. Since the same effect can be achieved in the neighborhoods of the other exposure joint lines 23a, 23c and 23d, the display characteristics of the liquid crystal display can be improved.

The amount of one droplet of the liquid crystal 25 may be made smaller relative to a predetermined total amount dispensed to dispense the liquid crystal 25 closer to the exposure joint lines 23a, 23b, 23c and 23d. For example, the amount of one droplet of the liquid crystal 25 is halved from that shown in FIGS. 3A and 3B relative to a predetermined total amount dispensed. Since the total amount of the liquid crystal 25 dispensed is kept unchanged, the number of droplets of the liquid crystal 25 is doubled. Since the liquid crystal 25 is dispensed at equal intervals, the distance between adjoining dispensing positions is approximately halved when the number of droplets is doubled. Therefore, the distances between the positions where the liquid crystal 25 is dispensed and the positions associated with the exposure joint lines 23a, 23b, 23c and 23d become shorter than the distances shown in FIGS. 3A and 3B.

As thus described, the liquid crystal 25 can be dispensed closer to the exposure joint lines 23a, 23b, 23c and 23d by making the amount of one droplet of the liquid crystal 25 smaller relative to the predetermined total amount dispensed. Since this makes the boundaries between the stripe-like irregularities 24 and the grid-like irregularities 27 more unclear and results in a gentler transition of brightness, the stripe-like irregularities 24 and the grid-like irregularities 27 become less recognizable to human eyes. It is therefore possible to improve the display characteristics of the liquid crystal display.

The invention is not limited to the above-described embodiment and may be modified in various ways.

Although the liquid crystal 25 is dispensed onto the array substrate 1 in the above-described embodiment, this is not limiting the invention. For example, a plurality of droplets of the liquid crystal 25 may be dispensed onto the opposite substrate 29 using the above-described method. In this case, the same advantage as that in the above-described embodiment can be achieved by dispensing the plurality of droplets of the liquid crystal 25 in positions on the opposite substrate 29 which are at least associated with the exposure joint lines 23a, 23b, 23c and 23d.

While the above-described embodiment deals with the stripe-like irregularities 24 generated due to the exposure joint lines 23a, 23b, 23c and 23d and the grid-like irregularities 27 generated at boundaries where adjoining droplets of the liquid crystal 25 contact each other, this is not limiting the invention. For example, the same advantage as that in the above-described embodiment can be achieved with respect to other display irregularities that occur in a regular manner just as the stripe-like irregularities 24 and the grid-like irregularities 27.

While glass substrates are used as the array substrate 1 and the opposite substrate 29 in the above-described embodiment, this is not limiting the invention. For example, the same advantage as that in the above-described embodiment can be achieved by using an insulated substrate formed of resin as either or both of the substrates 1 and 29.

While the sealing material 11 is applied to the array substrate 1 in the above-described embodiment, this is not limiting the invention. For example, the same advantage as that in the above-described embodiment can be achieved by applying the sealing material 11 to the opposite substrate 29.

While the above-described embodiment is a transmissive liquid crystal display, this is not limiting the invention. For example, the same advantage as that in the above-described embodiment can be achieved in a reflective or transflective liquid crystal display.

What is claimed is:

1. A method of manufacturing a liquid crystal display, comprising the steps of:

forming a pattern layer on an array substrate by dividing a surface of the substrate into a plurality of regions to be exposed and performing divisional exposure for exposing each of the regions to be exposed;

dispensing a plurality of droplets of a liquid crystal in a matrix of rows and columns onto at least either the array substrate or an opposite substrate provided opposite to the array substrate such that centers of droplets of the liquid crystal are dispensed to deliberately coincide with center positions on a linear horizontal exposure joint line at boundaries between each of the regions to be exposed adjacent to each other and with center positions on each linear vertical exposure joint line of a plurality of exposure joint lines at boundaries between each of the regions to be exposed adjacent to each other; and combining the array substrate and the opposite substrate in vacuum in a face-to-face relationship with each other and restoring the atmospheric pressure to spread and seal the plurality of droplets of the liquid crystal between the array substrate and the opposite substrate.

2. A method of manufacturing a liquid crystal display according to claim 1, wherein the plurality of droplets of the liquid crystal are dispensed onto the array substrate.

3. A method of manufacturing a liquid crystal display according to claim 1, wherein the exposure joint line is in parallel with at least either a plurality of gate bus lines formed on the array substrate or a plurality of drain bus lines formed across the plurality of gate bus lines.

4. A method of manufacturing a liquid crystal display according to claim 1, wherein the plurality of droplets of the liquid crystal are dispensed at predetermined equal intervals in a direction substantially orthogonal to at least one of the exposure joint lines.

5. A method of manufacturing a liquid crystal display according to claim 4, wherein some of the liquid crystal is dispensed close to one of the exposure joint lines making the amount of one droplet of the liquid crystal smaller relative to a predetermined total amount dispensed.

6. A method of manufacturing a liquid crystal display according to claim 1, wherein each intersection of the horizontal exposure joint line and the vertical exposure joint lines has one of the droplets of the liquid crystal centered thereon.

* * * * *